United States Patent

Nelms

[15] 3,638,498
[45] Feb. 1, 1972

[54] FLUID STREAM SAMPLING APPARATUS

[72] Inventor: Jimmie J. Nelms, Luling, Tex.
[73] Assignee: Mobil Oil Corporation
[22] Filed: Mar. 11, 1968
[21] Appl. No.: 712,015

[52] U.S. Cl. .................................................73/422 TC
[51] Int. Cl. .....................................................G01n 1/10
[58] Field of Search............73/421, 421.5, 422, 422 TC

[56] References Cited

UNITED STATES PATENTS

| | | | |
|---|---|---|---|
| 2,183,338 | 12/1939 | Slough | 73/422 |
| 2,447,595 | 8/1948 | Pigott et al. | 73/422 |
| 2,608,866 | 9/1952 | Breedlove et al. | 73/422 |
| 2,736,201 | 2/1956 | Ohlsen et al. | 73/422 |
| 3,083,577 | 4/1963 | Nelson et al. | 73/422 TC |
| 3,084,554 | 4/1963 | Perilloux | 73/422 TC |
| 3,087,339 | 4/1963 | Henderson | 73/422 TC |
| 3,160,016 | 12/1964 | Middleton | 73/422 |
| 3,377,867 | 4/1968 | Nitescu | 73/422 |

*Primary Examiner*—S. Clement Swisher
*Attorney*—William J. Scherback, Frederick E. Dumoulin, Drude Faulconer, Donald L. Dickerson and Sidney A. Johnson

[57] ABSTRACT

An apparatus for obtaining samples from a fluid stream having a gas-eliminating section, a sampling section, and a control section. A probe is positioned in the main conduit through which the stream flows to continuously divert a portion of the stream into a sample chamber. At desired intervals, the control section actuates valve means to isolate fluid in the sample chamber and to allow gas from the gas eliminator to displace the fluid from the chamber into a sample container.

5 Claims, 5 Drawing Figures

INVENTOR
JIMMIE J. NELMS

Drude Faulconer
ATTORNEY

INVENTOR
JIMMIE J. NELMS
ATTORNEY

INVENTOR
JIMMIE J. NELMS

FLUID STREAM SAMPLING APPARATUS

BACKGROUND OF THE INVENTION

The present invention relates to a fluid sampler and more particularly relates to apparatus for automatically obtaining intermittent samples from a fluid stream wherein the samples are truly representative of the actual composition of the fluid.

Fluid which is normally produced from an oil well is a mixture of gas, crude oil, and water. Since most royalties are based on the crude oil produced, it is necessary not only to meter the total volume of fluid produced but also to determine the actual percentage of crude oil contained in said fluid. This is done by testing or sampling a fluid as it is produced from the well.

One of the most accurate procedures for determining the amount of crude oil in fluid produced from a well involves flowing the fluid from the well into a test tank and allowing it to settle. After the fluid has settled, a "gauger" measures the volumes of crude oil and water, respectively, takes samples of the fluids, bleeds the water from the lower end of the tank, drains the crude oil into a pipeline or central storage point, and reopens the tank to receive fluid from the well for the next test. The period of time involved in a typical tank test ranges from 8 to 24 hours. This procedure, being manual in nature, is carried out in relation to each well being produced and accordingly is both time consuming and relatively expensive.

To reduce this time and expense, devices have been developed which automatically obtain intermittent samples from the stream of produced fluid as it is flowed from the wellhead to a pipeline or storage points. The samples, which are taken at predetermined intervals, are collected in a container and can easily be analyzed when desired. However, serious problems arise in sampling procedures of this type. For one thing, the fluid is a mixture of immiscible components, e.g., oil and water, and the sampling device, by reason of its construction or the location in which it is placed, may obtain samples containing these components in proportions differing from those in which they actually exist in the flowing stream. Since even a small error is cumulative over long production periods, it is imperative that the sample taken from the stream be as representative of the actual composition of the flowing fluid as is possible.

SUMMARY OF THE INVENTION

The present invention provides sampling apparatus which overcomes many of the problems inherently present in many prior art samplers of this type and accordingly provides apparatus which is capable of automatically obtaining intermittent samples from a fluid stream which are actually representative of the composition of the fluid stream.

Structurally, the sampling apparatus is comprised of a gas elimination section for separating gas from the fluid stream prior to sampling said stream, a sampler section for actually obtaining and collecting samples from the fluid stream, and a control section for automatically actuating said sampler section whenever it is desired to take a sample from the fluid stream. The fluid stream from a producing well is directed into the gas eliminator section where gas in the fluid stream is separated and vented from the top of the gas eliminator section through a special valve means. An outlet is provided at the lower end of the gas eliminator section through which the degassed fluid stream passes into the sampler section.

The sampler section is comprised of a main conduit which has a meter positioned therein to measure the total flow volume through the sampler section. The majority of the degassed fluid flows through the main conduit into an outlet line which in turn leads to a pipeline or storage area. A sample probe, however, is positioned within the main conduit which normally diverts a portion of the fluid stream into a sample chamber. By actually positioning the probe within the main conduit as opposed to providing a sample tap on the main conduit, not only are more representative samples obtained but also any pressure sink in the fluid stream which normally occurs when a tap is suddenly opened is eliminated.

A first solenoid-operated three-way valve is positioned at the entrance of the sample chamber and allows flow from the probe into the sample chamber when the valve is in a first or deenergized position. A second solenoid-operated, three-way valve is positioned at the exit of the sample chamber and allows flow from the sample chamber to a sample bypass conduit when the second valve is in a first or deenergized position. The sample bypass line is connected between the sample chamber and the main conduit at a point spaced from the probe so that when the valves are in a first position, the diverted portion of the fluid stream will continuously flow through the probe, through the sample chamber, and through the sample bypass conduit back into the main conduit. By allowing the diverted portion of the fluid stream to flow continuously through the sample chamber, the fluid in the sample chamber is at all times truly representative of the actual fluid stream in the main conduit.

The first valve is also connected to the gas eliminator section so that when said first valve is moved to a second or energized position, gas from the gas eliminator section will flow into the sample chamber to displace positively any fluid present in the sample chamber. The second valve is likewise connected to a sample collection conduit so that when the second valve is moved to a second or energized position, flow from the exit of the sample collection conduit. The sample collection conduit leads to a sample collection container where the samples are collected for later analysis.

Means are provided in the main conduit between the probe and the sample bypass line to maintain a slight back pressure across the sampler section. This is done in order to ensure that the fluid stream will be in turbulent flow at the point of the probe and also to ensure that an isokinetic condition will exist at the probe opening. An isokinetic condition normally exists whenever the linear velocity of the diverted portion of the fluid stream through the opening of the probe is at least equal to the linear velocity of the fluid stream ahead of the probe. As is recognized by the art, both the isokinetic condition and the turbulent flow at the probe further assure that a representative, homogeneous mixture of the fluid stream will be diverted to the sample chamber. The means for maintaining such a back pressure across the sampler section is preferably a back pressure regulating valve which maintains a predetermined pressure regardless of flow rate. This is necessary in instances where the flow rate of the fluid stream varies from time to time in order to prevent excessive back pressures from building up across the sampler section which in turn might seriously effect the normal production of the well. In some instances, however, where the fluid stream remains at a substantially constant flow rate, a venturi in the main conduit can be used to maintain the desired back pressure.

The control section includes a timer means which is connected to the first and second valves and which energize both valves to move them simultaneously to their second position. In this position gas from the gas eliminator section will expel the fluid from the sampler chamber into the sample container as briefly described above. After the sample has been obtained, the timer deenergizes the valves and they return to their first position. The timer continues to energize the valves at predetermined intervals until a predetermined number of samples has been collected. At this time, the control section automatically ceases sampling operations.

The sampling apparatus of the present invention is highly reliable and has exhibited a high degree of accuracy in sampling fluid streams having an extreme range of component parts, e.g., 99 percent water, 1 percent crude oil. Furthermore, being fully automatic, the present invention reduces the time required of an operator to a minimum. The actual construction, operation, and the apparent advantages of the invention will be better understood by referring to the drawings in which like numerals identify like parts.

DESCRIPTION OF THE PREFERRED EMBODIMENT

Figure 1:
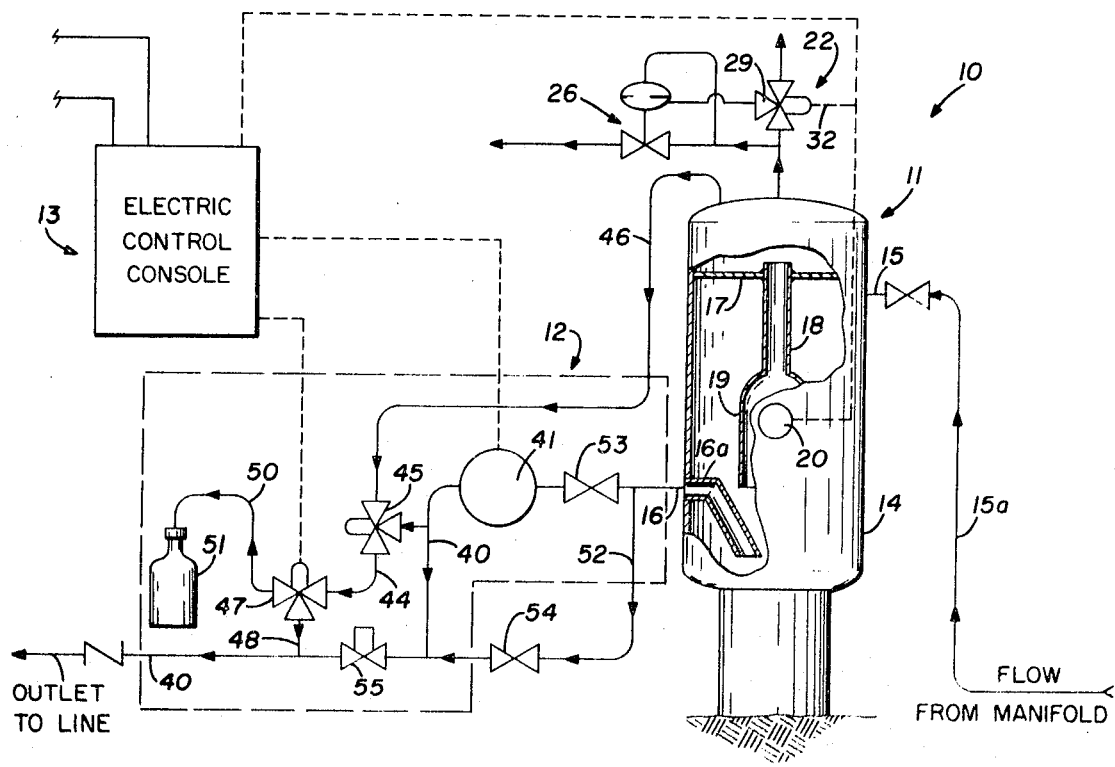
FIG. 1 is a schematic view of the preferred embodiment of the present invention.
Figure 2:
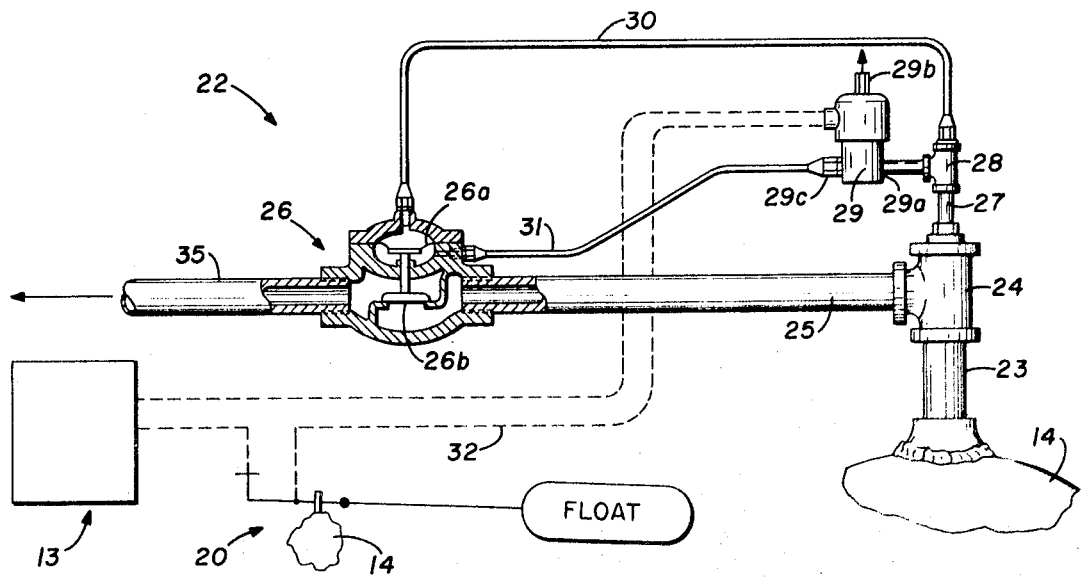
FIG. 2 is an elevational view of the valve means associated with the gas eliminator section of the present invention.

Referring more particularly to the drawings, FIG. 1 discloses an automatic sampling apparatus 10 which is comprised of a gas eliminator section 11, a sampler section 12 and a control section 13. Gas eliminator section 11 is comprised of a gas eliminator 14 having an inlet 15 and an outlet 16. The construction details of the gas eliminator 14 from no part of the present invention and can be of any type which separates gas from the fluid stream. The particular gas eliminator 14 shown in FIG. 1 has a slotted-plate mist extractor 17 fixed therein which has secured thereto equalizing tube 18 which in turn carries a float shroud 19 at the lower end thereof. Liquid level control float switch 20 is positioned within the float shroud 19 and is electrically coupled both to control section 13 and to special valve means 22 which is provided at the upper end of gas eliminator 14 for venting gas therefrom after it has separated from the fluid stream. As seen more clearly in FIG. 2, special valve means 22 is comprised of an outlet pipe 23 connected to the top of gas eliminator 24. A tee 24 is provided in line 23 to split the gas into two parts with the first part passing through line 25 to motor valve 26 and the second part passing through line 27 to tee 28. Tee 28 allows part of the gas to flow to solenoid-operated, pilot valve 29 and part to flow through line 30 to the upper side of diaphragm 26a of motor valve 26. The diaphragm 26a is affixed to valve element 26a which normally closes motor valve 26 to flow. Pilot valve 29 has two outlets, 29b which is vented to the atmosphere and 29c which is connected to the lower side of diaphragm 26a by line 31. Pilot valve 29 is electrically connected to float switch 20 and control section 13 by electric leads 32.

The operation of special valve means 22 is as follows. Fluid from a producing well enters inlet 15 of gas eliminator 14 from a line 15a. Gas breaks from the fluid stream as it enters the eliminator with the liquid part of the stream collecting in the lower end thereof and the free gas accumulating in the upper end of eliminator 14. With float switch 20 in an up position, as will be more fully explained immediately below, the motor valve 26 will be closed so that gas at the top of the eliminator 14 can only flow through line 30 to the upper side of diaphragm 26a of motor valve 26. At this time, the pilot valve 29 will be deenergized and outlet 29c will be opened to outlet 29b so that the underside of diaphragm 26a is vented to the atmosphere. Since diaphragm 26a has two-to-one area ratio with respect to valve element 26b, the valve element 26b will be held on its seat to maintain valve 26 in a closed position. As gas accumulates in the top of gas eliminator 14, the pressure will increase thereby forcing the liquid level down which causes float switch 20 to close. Float switch 20 energizes valve 29 to close communication between the outlets 29b, and 29c and to open flow from 29a to 29c. This allows gas to flow to the underside of diaphragm 26a to equalize the pressure above and below the diaphragm. Now gas pressure acting on valve element 26b will force the element upward to open valve 26, allowing gas to vent from the eliminator through pipe 35. As gas is vented from the top of the gas eliminator 14, the liquid level will again rise within the eliminator, thus opening float switch 20 to deenergize valve 29 which against follows valve 26 to close. Valve means 22, therefore, maintains a desired liquid level within gas eliminator 14 and allows excess gas to be vented from the top thereof at all times.

The degassed portion of the fluid stream flows from a dip tube 16a within eliminator 14 through outlet 16 into sampler section 12. Sampler section 12 is comprised of main conduit 40 having flow meter 41 positioned therein which measures the total flow through the sampler section. Meter 41 has an impulse switch 41a (see FIG. 4) associated therewith which impulses an electric totalizer 42 upon the passing of a desired volume through the flow meter. This will be explained more in detail in relation to the description of the control section 13 described below.

Figure 3:
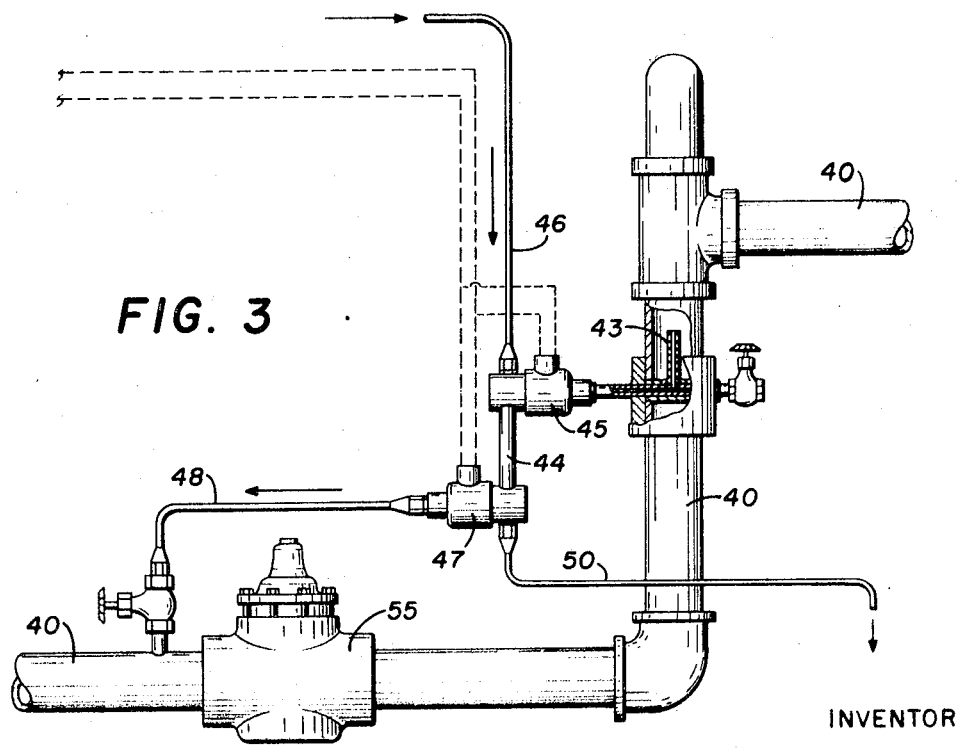
FIG. 3 is an elevational view, partly in section, of the sampler section of the invention shown in FIG. 1.

Referring now to FIG. 3, a sample probe 43 is positioned within main conduit 40 to allow a sample of the fluid stream to be diverted continuously into sample chamber 44. A first solenoid-operated, three-way valve 45 is positioned at the entrance of sample chamber 44 and when in a normal, deenergized position will allow flow through valve 45 into chamber 44. Also coupled to valve 45 is a conduit 46 which is connected to the upper end of gas eliminator 14 (see FIG. 1). Valve 45 when in its first position will be closed to flow from conduit 46 but in its energized or second position will be closed to flow from probe 43 and open to flow from conduit 46.

A second solenoid-operated, three-way valve 47 is positioned at the exit of sample chamber 44 and when in a first or deenergized position will be open for flow from sample chamber 44 to sample bypass conduit 48. Sample bypass conduit 48 is connected to main conduit 40 at a point spaced from probe 43, as clearly shown in the drawings. Valve 47 when in a second position or an energized position will be opened to sample-collection conduit 50 which in turn leads to sample container 51 (see FIG. 1). Positioned in main conduit 40 is a typical back pressure, regulating valve 55 which is capable of maintaining a certain back pressure across the sampler section 12 regardless of the flow rate through the system. That is, the valve 55 will open or close partially to maintain a set pressure regardless of the flow rate therethrough. The back pressure assures that an isokinetic condition will exist at probe 43 and also ensures that the fluid stream will be in turbulent flow at that point. By establishing these conditions, a truly representative sample of the fluid stream will be diverted through probe 43 into sample chamber 44 at all times. A fluid stream bypass conduit 52 and associated valves 53, 54, respectively, are provided as shown in FIG. 1 to allow the fluid stream to bypass completely sampler section 12 when desired.

The operation of sampler section 12 is as follows. A degassed fluid stream passes through exit 16 of gas eliminator 14 into main conduit 40. The fluid stream passes through meter 41 which records the volume of the fluid flowing therethrough, and continues to flow through main conduit 40. As the stream passes probe 43, a portion thereof will be diverted into sample chamber 44. At the desired time, as will be explained in detail below, control section 13 impulses solenoid valves 45, 47, respectively, to move simultaneously said valves from their first position to their second position. This isolates a sample of the diverted portion of the fluid stream in chamber 44 and at the same time allows gas from the top of gas eliminator 14 to pass through conduit 46 into sample chamber 44 to force the sample therefrom into sample collection conduit 50 and hence into the sample container 51. After the sample has been taken, control section 13 deenergizes valves 45, 47 respectively, and allows them to return to their first position, thereby reestablishing flow from probe 43 through sample chamber 44, through sample bypass line 48 back into main conduit 40. By maintaining a set back pressure with valve 55, a truly representative sample will be forced through probe 43 at least with the same linear velocity as the stream bypassing probe 43, thereby ensuring that an isokinetic condition will exist at probe 43 and that the fluid stream at the point of probe 43 will be in turbulent flow.

Figure 4:
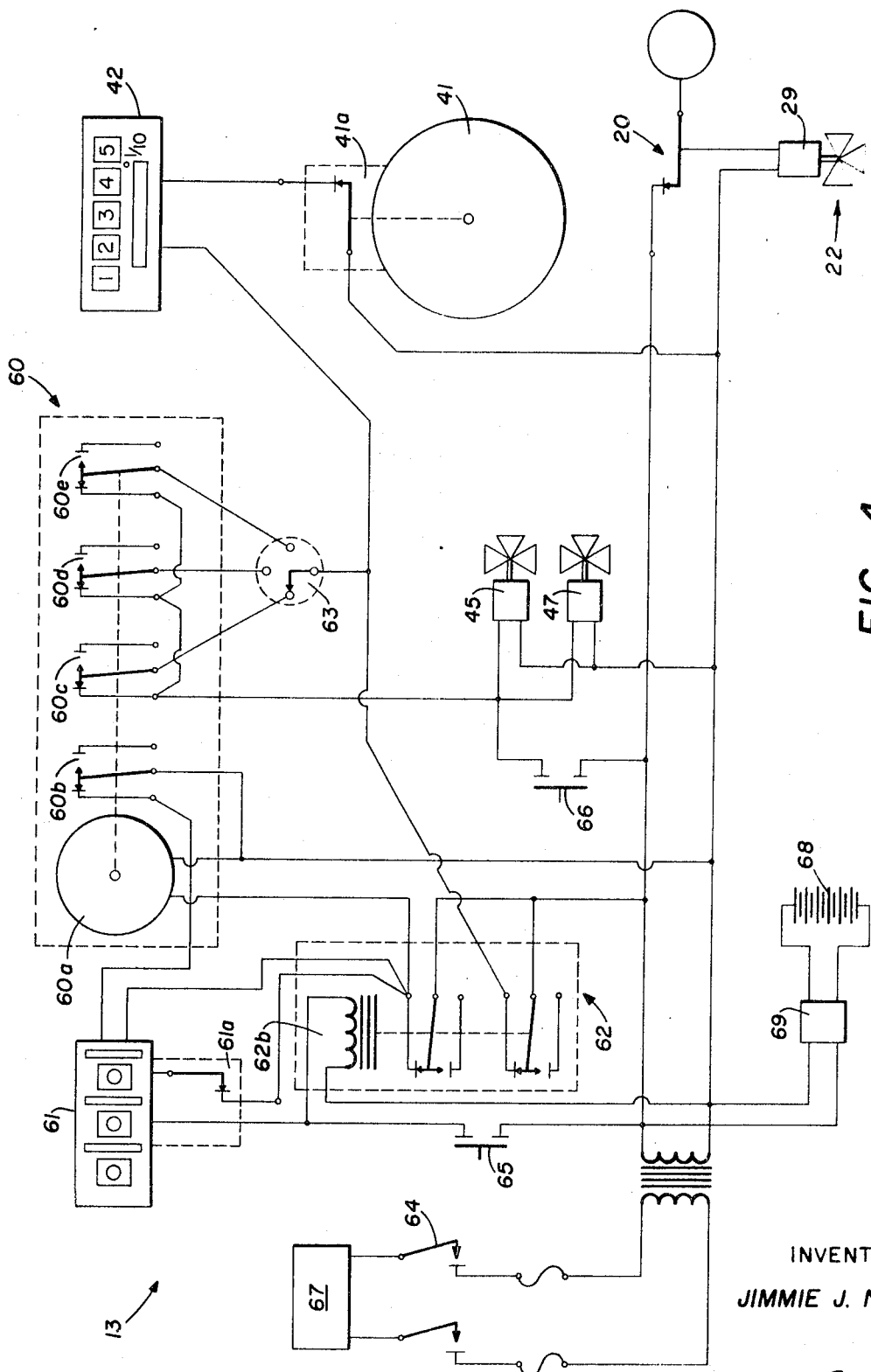
FIG. 4 is a schematic view of the control section of the present invention.

Control section 13, which automatically controls the sampling operations of the apparatus 10, is shown in detail in FIG. 4. Control apparatus is basically comprised of an electric totalizer 42, a predetermined counter 61, a repeat cycle timer 60, an impulse sequence relay 62, a sample-rate select switch 63, a fused master switch 64, and manual switches 65, 66 respectively. Repeat cycle timer 60 is of the type which has a plurality of microswitches which are actuated by motor-driven cams and is one well known in the art. The particular repeat timer shown in FIG. 4 has four microswitches 60b, 60c, 60d, 60e, which are actuated by respective cams (not shown) which in turn are driven by a synchronous motor 60a. The motor 60a makes one revolution in a set period of time, e.g., every 4minutes. Microswitch 60b impulses a counter coil, not shown, in predetermined counter 61 and either microswitch 60c, 60d, or 60e impulses the solenoid valves 45, 47, depending upon the position of sample-rate, select switch 63. Each of the microswitches 60c, 60d, 60e has a differentially designed cam which provides for a different number of impulses during each revolution of the motor. For example, the cam for microswitch 60c may have one cutout therein allowing one sample per revolution or 360 samples per day for a 4-minute revolution, the cam for microswitch 60d may have two cutouts allowing 720 samples per day, and microswitch 60e may have four cutouts allowing for 1,440 samples per day.

Predetermining counter 61 is positioned in the circuit to shut off the sampling operations when a predetermined number of samples has been taken. Digits which determine how many samples are to be taken are turned up on the counter with thumb wheels and the counter counts down to 000, one digit for each impulse received by the counter. When the counter reaches 000, switch 61a will close.

Impulse sequence relay 62 is a double-pole, double-throw switch which is actuated by a solenoid coil 62b and which reverses contact on each impulse received by the solenoid coil 62b. One of the throws of the impulse relay 62 is connected to electric totalizer 42 which records the actual flow through meter 41, and the other throw is connected to the timer 60. Electric totalizer 42 is actuated by impulse switch 41a on meter 41. Impulse switch 41a is responsive to a set volume of flow through meter 41, e.g., one impulse for every one-tenth barrel of flow. Such meters and totalizers are well known in the art. Power can be supplied to control section 13 from a standard AC source 67 or, if portable operation is desired, a battery 68 and an AC to DC inverter 69 can be used.

Operation of control section 13 is as follows. To commence the sample operation, the momentary contact start switch 65 is depressed to energize coil 62b of the impulse relay 62. This closes the throws of relay 62, as shown in FIG. 4 thereby allowing current to flow to repeat cycle timer 60 and to meter 41. Cams (not shown) driven by synchronous motor 60a will actuate microswitch 60b and accordingly one of the microswitches 60c, 60d, 60e, depending on the select switch 63, at desired intervals to impulse the count coil in counter 61 and simultaneously actuate solenoid valves 45, 47 to take a sample of the fluid stream according to the above-described sampling procedure. This operation will continue until the counter has been counted down to 000 at which time 61a will close to energize again coil 62b of impulse sequence relay 62, thereby reversing the throws of relay 62 to cease flow of electricity to the timer 60 and to the counter 42 and accordingly cease sampling operations. Manual switch 65 can be depressed at any time to energize valves 45, 47 to take a sample manually when desired. As clearly shown in FIG. 4, float switch 20 and the special valve means 22 are provided with a live circuit at all times so that the gas can be expelled from gas eliminator 14 even while other impulse and control circuits are off.

Figure 5:
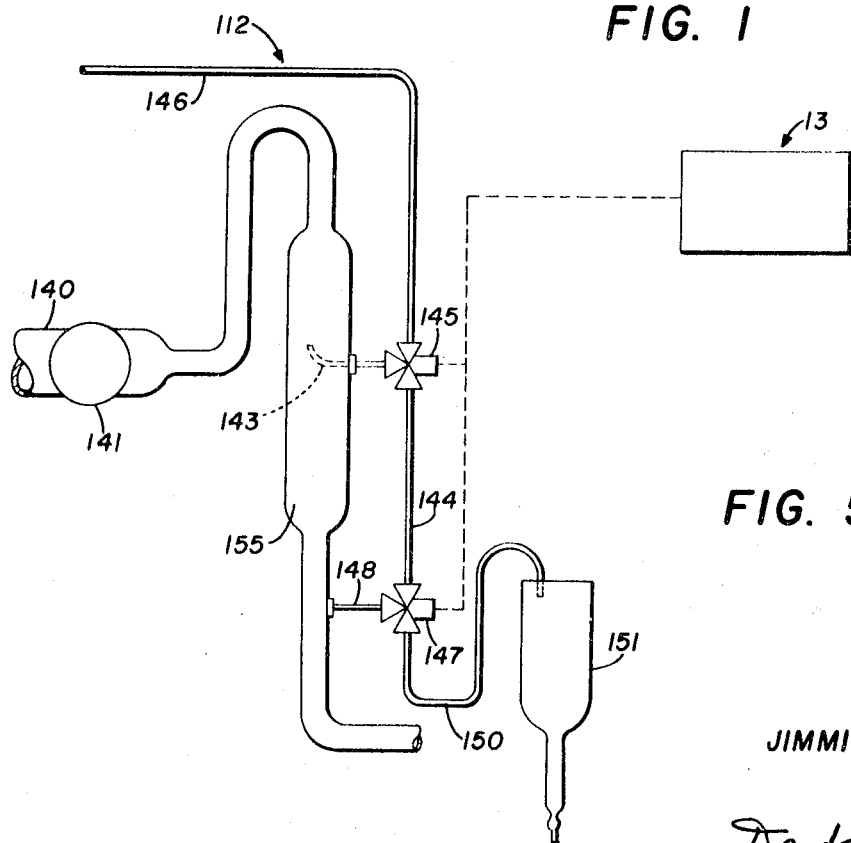
FIG. 5 is a schematic view of a second embodiment of the present invention.

FIG. 5 discloses a modification of the sampling apparatus in accordance with the present invention. The gas eliminator section and the control section are identical to that disclosed above. The sampler section 112 is similar to the sampler section 12 and the modifications disclosed in FIG. 1, with the exception that an orifice 155 is used to maintain back pressure across the sampler section in place of a back pressure regulating valve. Sampler section 112 is comprised of a main conduit 140 which is adapted to be connected to the outlet of a gas eliminator, such as that shown in FIG. 1. Meter 141, identical to meter 41 above, is positioned in main conduit 140 for measuring flow through the sampler section 112. Sample probe 143 is positioned in main conduit 140 to divert a portion of the fluid stream through sampler chamber 144 and back to main conduit 140 by way of sample bypass conduit 148. Three-way, solenoid-operated valves 145, 147, correspond in structure and in operation to the valves 45, 47, respectively, described above. Gas conduit line 146 is connected at one end to solenoid valve 145 and at its other end to the gas eliminator, similarly, as disclosed in FIG. 1. Sample collection conduit 150 leads from solenoid valve 147 to sample container 151. Control section 13 as describes above is electrically connected to solenoid valves 145, 147 to actuate the valves when a sample is desired to be taken. The operation of sampler section 112 is identical to the operation described above in connection with sampler section 12 of FIG. 1. A degassed fluid stream flows from the gas eliminator into main conduit 140 where meter 141 records total flow through the sampler section. The fluid stream continues through main conduit 140 with a sample of the fluid stream being diverted through probe 143, through sample chamber 144, and back through sample bypass line 148 into the main conduit. When a sample is desired to be taken, control section 13 energizes solenoid valves 145, 147, respectively, to close flow through chamber 144 and open the valve 145 to the gas present in line 146. Also at this time, valve 147 will be opened for flow through collection conduit 50 so that gas passing from line 146 will force the sample from chamber 144 through line 150 into the sample container 151.

Although particular embodiments of the subject invention have been illustrated and described, the disclosure is intended to cover all changes and modifications which do not constitute departure from the spirit and scope of the invention.

What is claimed is:

1. An apparatus for obtaining intermittent samples from a fluid stream comprising:

a main conduit means through which said fluid stream flows;

probe means positioned within said main conduit and adapted to divert a portion of said fluid stream from said main conduit means;

a sample chamber means connected to said probe means and adapted to receive sand portion of said fluid stream from said probe means;

a sample bypass conduit means connected at one end to said sample chamber means and at its other end to said main conduit means at a point spaced downstream from said probe means;

a sample collection conduit means connected to said sample chamber means;

a sample collection container means adapted to receive flow from said sample collection conduit means;

valve means, connected to said sample chamber means, which in a first position allows said portion of said fluid stream to flow continuously from said probe means, through said sample chamber means, and through said sample bypass conduit means into said main conduit means and when in a second position prevents flow from said probe means to said sample chamber means and allows flow from said sample chamber means through said sample collection conduit means into said sample collection container means;

means, connected to said valve means, for moving said valve means from said first to said second position, means for eliminating gas from said fluid stream connected to said main conduit means upstream from said probe means;

means for positively expelling fluid from said sample chamber means, said means including means connected between said means for eliminating gas and said valve means, for supplying gas under pressure from said means for eliminating gas to said sample chamber means when said valve means is in said second position; and back pressure means, positioned in said main conduit means at a point between said probe means and said sample bypass conduit means to maintain a back pressure across the apparatus.

2. An apparatus for obtaining intermittent samples from a fluid stream comprising:
- a main conduit means through which said first stream flows;
- probe means positioned within said main conduit and adapted to divert a portion of said fluid stream from said main conduit means;
- a sample chamber means connected to said probe means and adapted to receive said portion of said fluid stream from said probe means;
- a sample bypass conduit means connected at one end to said sample chamber means and at its other end to said main conduit means at a point spaced downstream from said probe means;
- a sample collection conduit means connected to said sample chamber means;
- a sample collection container means adapted to receive flow from said sample collection conduit means;
- a first solenoid-operated valve means, positioned at the entrance of said sample chamber, which is open to flow from said probe means to said sample chamber when in said first position and which is closed to flow from said probe means when in said second position;
- a second solenoid-operated valve means, positioned at the exit of said sample chamber, which is opened to flow from said sample chamber to said sample bypass conduit means when in said first position and which is closed to flow to said bypass conduit means and opened to flow to said sample collection conduit means when in said second position;
- an automatic timer means for simultaneously energizing said solenoid-operated valves at desired sampling intervals;
- means, connected to said main conduit means upstream of said probe means, for eliminating gas from the fluid stream;
- means for positively expelling fluid from said sample chamber means, said means comprising means, connected between said means for eliminating gas and said first valve means, for supplying gas under pressure from said means for eliminating gas to said sample chamber means whenever said first valve means is in said second position; and
- back pressure means, positioned in said means conduit means at a point between said probe means and said sample bypass conduit means, to maintain a back pressure across the apparatus.

3. An apparatus in accordance with claim 2 wherein said back pressure means comprises:
- a back pressure regulating valve means.

4. An apparatus in accordance with claim 3 including:
- means, connected to said main conduit means upstream from said probe means, for measuring total flow through said main conduit means.

5. An apparatus in accordance with claim 4 including:
- means, connected to said automatic timer means for ceasing sampling operations of said apparatus after a predetermined number of samples have been obtained.

* * * * *

UNITED STATES PATENT OFFICE
CERTIFICATE OF CORRECTION

Patent No. 3,638,498           Dated   February 1, 1972

Inventor(s) JIMMIE JOE NELMS

It is certified that error appears in the above-identified patent and that said Letters Patent are hereby corrected as shown below:

Column 1, line 14, "a" should be --the--;

line 31, "The" should be --These--.

Column 2, line 26, after "sample" (first occurrence) --chamber is shifted from the sample by-pass conduit to the sample-- should be inserted;

line 47, "effect" should be --affect--;

line 53, "energize" should be --energizes--;

line 56, "sampler" should be --sample--;

line 71, after "parts" the period (.) should be deleted and --and in which:--should be added.

Column 3, line 15, after "section 13" the comma (,) should be canceled and a period (.) inserted;

line 17, "from" should be --form--;

line 26, "has" should be --is--;

line 29, "eliminator 24" should be --eliminator 14--;

line 35, "element 26a" should be --element 26b--;

line 54, after "has" --a-- should be inserted;

line 64, before "element" --valve-- should be inserted;

UNITED STATES PATENT OFFICE
CERTIFICATE OF CORRECTION

Patent No. 3,638,498　　　　　　　Dated　　February 1, 1972

Inventor(s) JIMMIE JOE NELMS　　　　　PAGE - 2

It is certified that error appears in the above-identified patent and that said Letters Patent are hereby corrected as shown below:

Column 3, line 68, "against follows" should be --again allows--;

line 75, before "flow" --a-- should be inserted.

Column 4, line 33, "The" should be --This--.

Column 5, line 10, "differentially" should be --differently--;

line 18, "Predetermining" should be --Predetermined--.

Column 6, line 3, after "147" the comma (,) should be deleted;

line 9, "describes" should be --described--;

line 24, "conduit 50" should be --conduit 150--;

line 40, "sand" should be --said--;

line 61, after "position" the comma (,) should be a semicolon (;);

line 66, after "means" (third occurrence) a comma (,) should be inserted;

line 71, after "means" (first occurrence) the comma (,) should be deleted.

Column 7, line 3, "first" should be --fluid--.

Column 8, line 14, "means" (second occurrence) should be --main--;

line 26, after "means" (second occurrence) a comma (,) should be inserted.

Signed and sealed this 11th day of July 1972.

(SEAL)
Attest:

EDWARD M. FLETCHER, JR.　　　　　　ROBERT GOTTSCHALK
Attesting Officer　　　　　　　　　　Commissioner of Patents